(12) United States Patent
Fäth et al.

(10) Patent No.: US 9,683,482 B2
(45) Date of Patent: Jun. 20, 2017

(54) TURBOCHARGER WHICH IS INTEGRATED INTO THE CYLINDER HEAD OF AN ENGINE

(75) Inventors: Holger Fäth, Fußgönheim (DE); Ralf Böning, Reiffelbach (DE)

(73) Assignee: Continental Automotive GmbH, Hannover (DE)

( * ) Notice: Subject to any disclaimer, the term of this patent is extended or adjusted under 35 U.S.C. 154(b) by 718 days.

(21) Appl. No.: 13/992,867

(22) PCT Filed: Dec. 2, 2011

(86) PCT No.: PCT/EP2011/071646
§ 371 (c)(1),
(2), (4) Date: Jul. 16, 2013

(87) PCT Pub. No.: WO2012/076416
PCT Pub. Date: Jun. 14, 2012

(65) Prior Publication Data
US 2013/0287564 A1 Oct. 31, 2013

(30) Foreign Application Priority Data
Dec. 9, 2010 (DE) .......... 10 2010 062 749

(51) Int. Cl.
*F02B 37/00* (2006.01)
*F02B 33/00* (2006.01)
(Continued)

(52) U.S. Cl.
CPC .............. *F02B 33/00* (2013.01); *F01D 25/24* (2013.01); *F02B 37/00* (2013.01); *F02B 67/10* (2013.01);
(Continued)

(58) Field of Classification Search
CPC ...... F02B 33/40; F02B 39/005; F01D 25/125; F01D 25/16; F01D 25/183; F02F 1/243;
(Continued)

(56) References Cited

U.S. PATENT DOCUMENTS 3,673,798 A * 7/1972 Kuehl .................. F02C 6/12
123/54.7
5,322,299 A * 6/1994 Terai ................... F16J 15/0818
277/596

(Continued)

FOREIGN PATENT DOCUMENTS

DE 975 375 C 11/1961
DE 975375 C * 11/1961 .............. F02B 37/00
(Continued)

*Primary Examiner* — Craig Kim
*Assistant Examiner* — Juan G Flores
(74) *Attorney, Agent, or Firm* — Laurence A. Greenberg; Werner H. Stemer; Ralph E. Locher

(57) ABSTRACT

A turbocharger includes a turbine with a turbine wheel, a compressor with a compressor wheel and a shaft mounted in a bearing unit. The turbine wheel and the compressor wheel are disposed on the shaft. The turbine wheel is disposed in a turbine housing. The compressor wheel is disposed in a compressor housing. The turbocharger is integrated into an aperture or recess of the cylinder head of an engine and the turbine housing is formed integrally in the cylinder head.

10 Claims, 4 Drawing Sheets

(51) Int. Cl.
*F01D 25/24* (2006.01)
*F02B 67/10* (2006.01)
*F02C 6/12* (2006.01)
*F02F 1/24* (2006.01)
*F04D 29/42* (2006.01)
*F04D 29/60* (2006.01)
*F04D 29/62* (2006.01)
*F04D 25/02* (2006.01)
*F02F 1/40* (2006.01)

(52) U.S. Cl.
CPC ............... *F02C 6/12* (2013.01); *F02F 1/243* (2013.01); *F04D 25/024* (2013.01); *F04D 29/4206* (2013.01); *F04D 29/601* (2013.01); *F04D 29/624* (2013.01); *F02F 1/40* (2013.01); *F05D 2220/40* (2013.01); *Y02T 10/144* (2013.01)

(58) Field of Classification Search
CPC ...... F02F 1/40; F04D 25/024; F04D 29/4206; F04D 29/602; F04D 29/624
See application file for complete search history.

(56) References Cited

U.S. PATENT DOCUMENTS

| | | | |
|---|---|---|---|
| 6,354,083 B1* | 3/2002 | Shuttleworth | F01D 25/125 60/597 |
| 9,086,011 B2* | 7/2015 | Roth | F02B 37/007 |
| 2008/0048402 A1* | 2/2008 | Sailer | F16J 15/0825 277/627 |
| 2010/0189558 A1 | 7/2010 | Böning et al. | |
| 2010/0296920 A1 | 11/2010 | Koch | |
| 2012/0288367 A1 | 11/2012 | Boening et al. | |
| 2013/0055713 A1* | 3/2013 | Drangel | F01N 13/10 60/605.1 |

FOREIGN PATENT DOCUMENTS

| | | |
|---|---|---|
| DE | 10 2007 017 854 A1 | 10/2008 |
| DE | 10 2007 034 493 B3 | 2/2009 |
| DE | 102009053106 A1 | 5/2011 |
| JP | 5752624 A | 3/1982 |
| JP | 2002303145 A | 10/2002 |
| JP | 2006063851 A | 3/2006 |
| WO | 2009019153 A2 | 2/2009 |

* cited by examiner

TURBOCHARGER WHICH IS INTEGRATED INTO THE CYLINDER HEAD OF AN ENGINE

BACKGROUND OF THE INVENTION

Field of the Invention

The invention relates to a turbocharger which is integrated into the cylinder head of an engine.

Turbochargers are used to improve the efficiency of an internal combustion engine and thus to increase the power output thereof. For this purpose, the turbocharger has a turbine with a turbine wheel and a compressor with a compressor wheel, wherein the two rotor wheels are arranged on a common shaft. In this arrangement, the turbine wheel is driven by an exhaust gas mass flow from a connected internal combustion engine and, in turn, drives the compressor wheel. The compressor compresses induced fresh air and delivers it to the internal combustion engine. The shaft is supported in a bearing housing of the turbocharger. The turbine wheel of the turbine is furthermore arranged in a turbine housing, and the compressor wheel of the compressor is arranged in a compressor housing.

During operation on the internal combustion engine or on a connected engine, a turbocharger of this kind has to meet a very wide variety of requirements. One of these requirements comprises accepting the high temperatures which occur, which may arise in the turbocharger housing owing to the hot exhaust gas mass flow, for example.

The conventional design of the turbocharger provides individual housings, each of which consists of a material matched to the temperature prevailing there. Here, the compressor housing is generally composed of aluminum, while the bearing housing is made of gray cast iron, and the bearing housing can additionally also be of watercooled design. Owing to the high temperatures prevailing in the region of the turbine housing, said housing is generally composed of materials with a high nickel content. Owing to the different matched materials for the individual housings, these housings are designed as separate parts which are connected to one another and must furthermore be sealed off from one another. A turbocharger of this kind is therefore expensive to produce and assemble.

DE 10 2009 053 106 describes a turbocharger housing which is designed so as to be divided partially or completely into two housing halves in the longitudinal direction, wherein the portion of the turbocharger housing which is divided in the longitudinal direction has a compressor housing, a bearing housing and/or a turbine housing. A turbocharger housing of this kind has the advantage that the rotor assembly, i.e. the rotor wheels on the shaft and the bearing arrangement of the shaft, can be preassembled and then inserted as a complete assembly into the housing halves. Before being mounted in the housing halves, the rotor assembly can furthermore be subjected to balancing under operating conditions. The two housing halves are screwed together and must be sealed off relative to one another. DE 10 2009 053 106 furthermore contains information to the effect that one half or the whole of the turbocharger housing can be integrated into an engine block and/or into the cylinder head of a connected engine.

BRIEF SUMMARY OF THE INVENTION

The object of the invention consists in identifying a way of reducing the weight of an engine.

This object is achieved by a turbocharger having a turbine with a turbine wheel, a compressor with a compressor wheel and a shaft mounted in a bearing unit. The turbine wheel and the compressor wheel are disposed on the shaft, the turbine wheel is disposed in a turbine housing, the compressor wheel is disposed in a compressor housing, the turbocharger is integrated into an aperture in the cylinder head of an engine and the turbine housing is formed integrally in the cylinder head. Advantageous embodiments and developments of the invention are given in the dependent claims.

The advantages of the invention are based, in particular, on the fact that the cylinder head of an engine is used as a turbine housing. In this case, the inner contour of the cylinder head is shaped in such a way that it corresponds to the desired shape of the turbine housing. Through this joint use of the cylinder head as a turbine housing, the turbine of the turbocharger does not require an additional, dedicated housing. Moreover, the joint use of the cylinder head as a turbine housing results in a significant reduction in the weight of the engine, an improved package and reduced system costs. Thus, it does not require any additional lines, holders etc.

In an advantageous way, the bearing unit is inserted with the shaft, the turbine wheel and the compressor wheel into an aperture in the cylinder head, in the axial direction. As a result, there is the possibility of implementing the necessary sealing off of the cooling water supply and of the oil supply of the turbocharger by means of a single axial seal, which is preferably a flat gasket.

This flat gasket advantageously has an opening for the oil inlet, an opening for the water inlet, an opening for the water outlet and openings for fastening means, by means of which the turbocharger is fastened in or to the cylinder head. These fastening means are, for example, tie rods, which ensure firm seating of the turbocharger in the cylinder head.

Further advantageous embodiments and developments of the invention will emerge from the illustrative explanation on the basis of the figures, of which:

DESCRIPTION OF THE INVENTION

In the text which follows, a description is given of a turbocharger which has a turbine with a turbine wheel, a compressor with a compressor wheel, and a shaft mounted in a bearing unit, wherein the turbine wheel and the compressor wheel are arranged on the shaft, the turbine wheel is arranged in a turbine housing, the compressor wheel is arranged in a compressor housing, and the turbocharger is integrated into an aperture in the cylinder head of an engine, wherein the turbine housing is formed integrally in the cylinder head and the bearing unit is inserted with the shaft, the turbine wheel and the compressor wheel into the aperture in the cylinder head, in the axial direction of the shaft.

Figure 1:
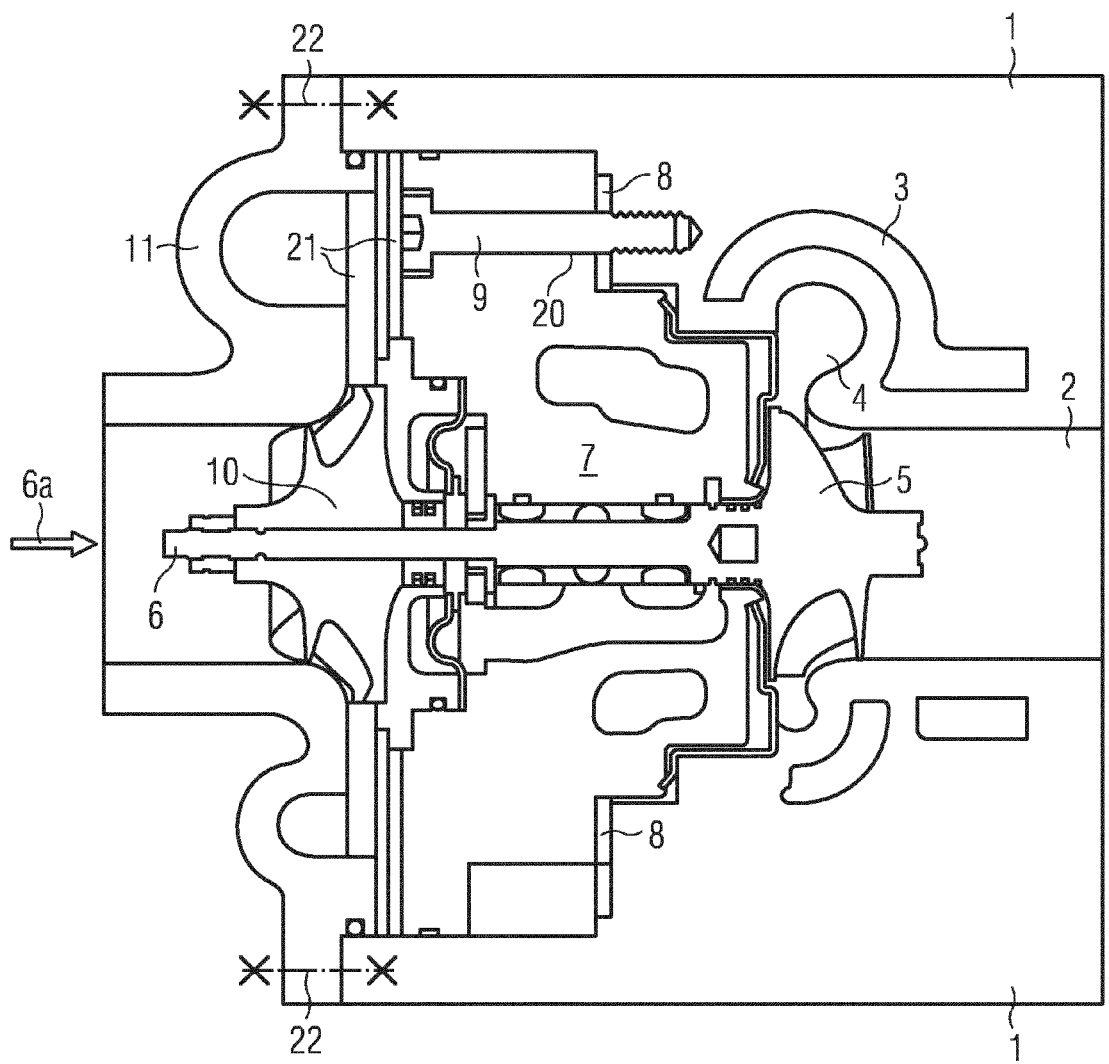
FIG. 1 shows a first sectioned view intended to illustrate a turbocharger built into the cylinder head of an engine.

FIG. 1 shows a first sectioned view intended to illustrate a turbocharger built into the cylinder head of an engine. Only the part of the cylinder head into which the turbocharger is built is shown in FIG. 1 and also in the subsequent figures.

The turbocharger has a turbine, a compressor and a bearing unit. Mounted in said bearing unit is a shaft 6, on which a compressor wheel 10 of the compressor and a turbine wheel 5 of the turbine are arranged.

The cylinder head 1 serves as the housing of the turbine. For this purpose, the interior of the cylinder head is shaped in such a way that it has the shape of a turbine housing. Among the features provided in this turbine housing is an aperture, within which the turbine wheel 5 of the turbocharger is rotatably mounted. Also provided in the region of the turbine housing are further apertures or ducts, through which—as explained below with reference to the other figures—the turbocharger is supplied with cooling water. Thus, in FIG. 1, a cooling water duct is designated by reference numeral 3. Moreover, a turbine-side flow space 4 is provided in the region of the turbine housing. The cylinder head 1 furthermore has a central aperture 2, which is the exhaust duct of the engine. The exhaust gas flowing through the exhaust duct drives the turbine wheel 5, which, for its part, drives the compressor wheel 10 of the compressor via the shaft 6 in order to supply the cylinders (not shown) of the engine with an increased quantity of fresh air.

The transition zone between the turbine housing and the bearing unit 7 of the turbocharger is provided with a seal 8, by means of which the cooling water supply of the turbocharger is sealed off. As explained below with reference to FIG. 4, this seal 8 is a flat gasket.

Fastening means 9, by means of which the exhaust gas turbocharger is fastened in an aperture in the cylinder head, are passed through fastening means openings 20 in said flat gasket 8. Tie rods are preferably used as fastening means.

These fastening means 9 are passed through the bearing unit 7 and are used to fasten the bearing unit 7 and the turbine in the cylinder head 1.

The compressor housing 11, within which the compressor wheel 10 is fastened to the shaft 6, forms a closure element for the aperture in the cylinder head into which the turbocharger is built. The compressor housing 11 is fastened either to the bearing unit 7 or on the cylinder head 1. As an alternative, the fastening means 9 can also be used to fasten the entire turbocharger to the cylinder head 1. A means for fastening the compressor housing 11 to the cylinder head 1 is illustrated in FIG. 1 by reference numeral 22. Within the compressor, there is a compressor-side flow space 21, within which a diffuser plate is arranged.

During the assembly of the turbocharger, a module comprising the shaft 6, the bearing unit 7, the turbine wheel 5 and the compressor wheel 10 is assembled first. This module is inserted as a complete unit, in the axial direction 6a of the shaft 6, into the aperture in the cylinder head 1, in which the turbine housing formed integrally in the cylinder head is already situated.

Installation of the compressor housing 11 into the cylinder head 1 and fastening of the compressor housing to the cylinder head 1 then takes place. The compressor housing 11 inserted into the cylinder head 1 and fastened to the latter forms a closure element or a cover for the aperture in the cylinder head into which the turbocharger is inserted.

As already explained above, cooling water is supplied to the turbocharger through the cylinder head, and therefore there is no need for any separate lines, any separate seals or any separate holders.

Figure 2:
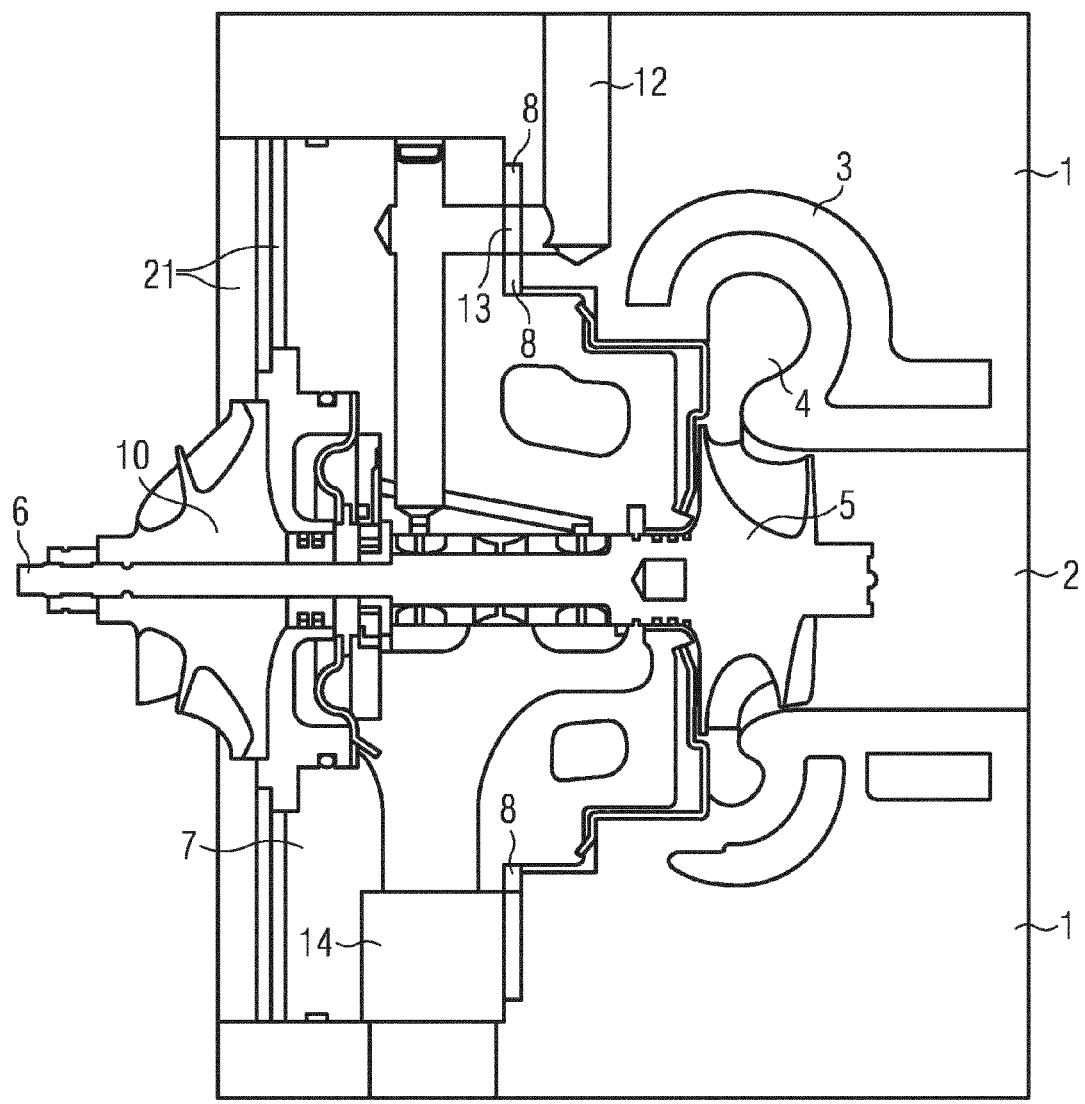
FIG. 2 shows a second sectioned view intended to illustrate a turbocharger built into the cylinder head of an engine.

FIG. 2 shows a second sectioned view intended to illustrate a turbocharger built into the cylinder head 1 of an engine, the oil supply to the turbocharger being illustrated in greater detail in this second sectioned view. Thus, FIG. 2 shows the oil inlet 12 passing through the cylinder head 1. Said oil inlet leads through an opening 13 for the oil inlet, which is provided in the flat gasket 8, into the bearing unit 7, in which the oil is distributed in a desired manner. FIG. 2 furthermore shows an oil outlet 14, which communicates via an oil outlet opening (not visible in FIG. 2) with an oil outlet of the cylinder head 1. Consequently, oil is fed into and discharged from the turbocharger through respective ducts, via which the turbocharger is connected to respectively associated ducts in the cylinder head.

Figure 3:
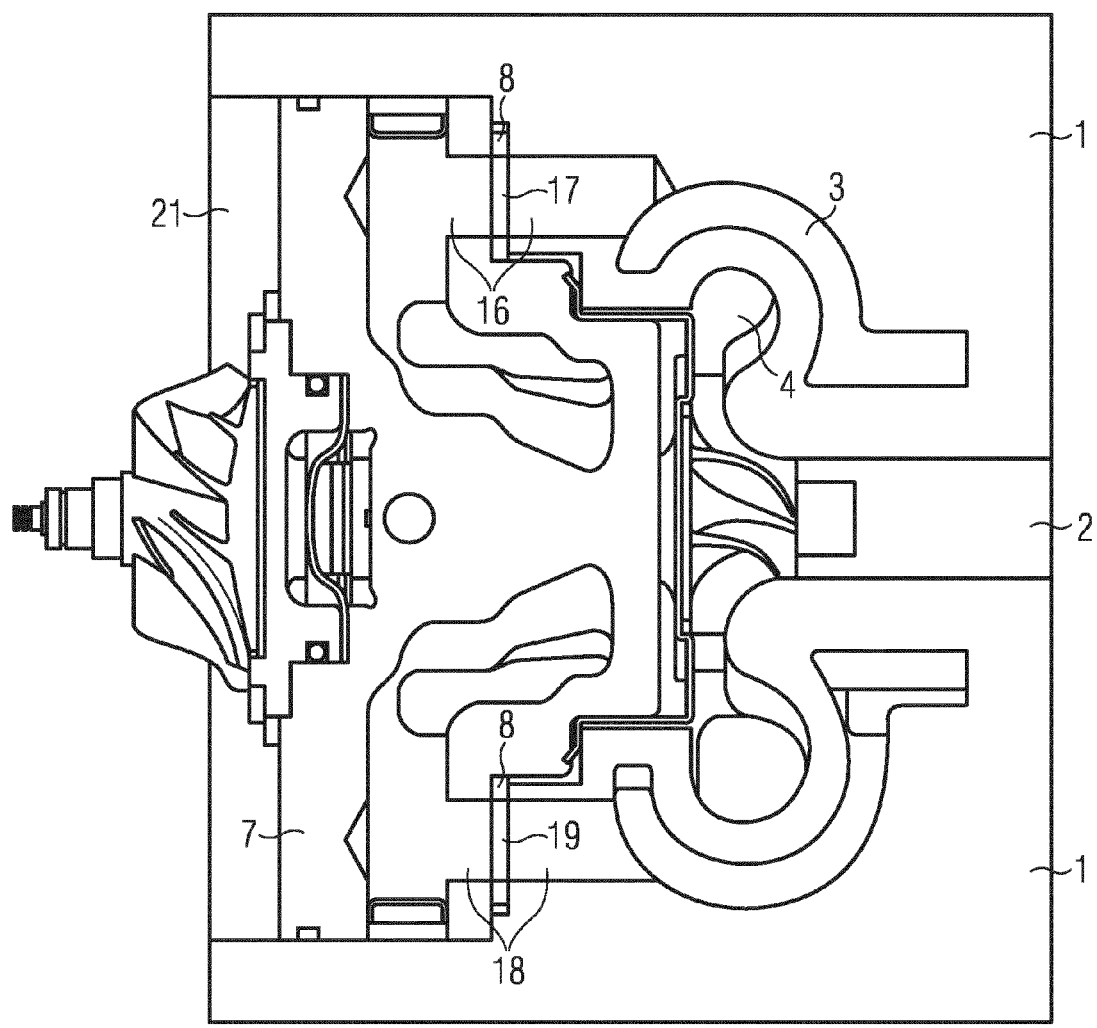
FIG. 3 shows a third sectioned view intended to illustrate a turbocharger built into the cylinder head of an engine.

FIG. 3 shows a third sectioned view intended to illustrate a turbocharger built into the cylinder head of an engine, the cooling water supply to the turbocharger being illustrated in greater detail in this third sectioned view. Thus, FIG. 3 shows the water inlet 16, which passes through the cylinder head and is connected to the cooling water duct 3 of the cylinder head. This water inlet 16 leads through an opening 17, which is provided in the flat gasket 8, into the bearing unit 7 in order to perform the cooling required there. FIG. 3 furthermore shows a water outlet 18, which communicates via an opening 19 in the flat gasket 8 with a water outlet of the cylinder head 1. Consequently, cooling water is fed into the turbocharger, and water is discharged from the latter, through respective openings in the flat gasket 8, via which the turbocharger is connected to respectively associated ducts in the cylinder head 1.

Figure 4:
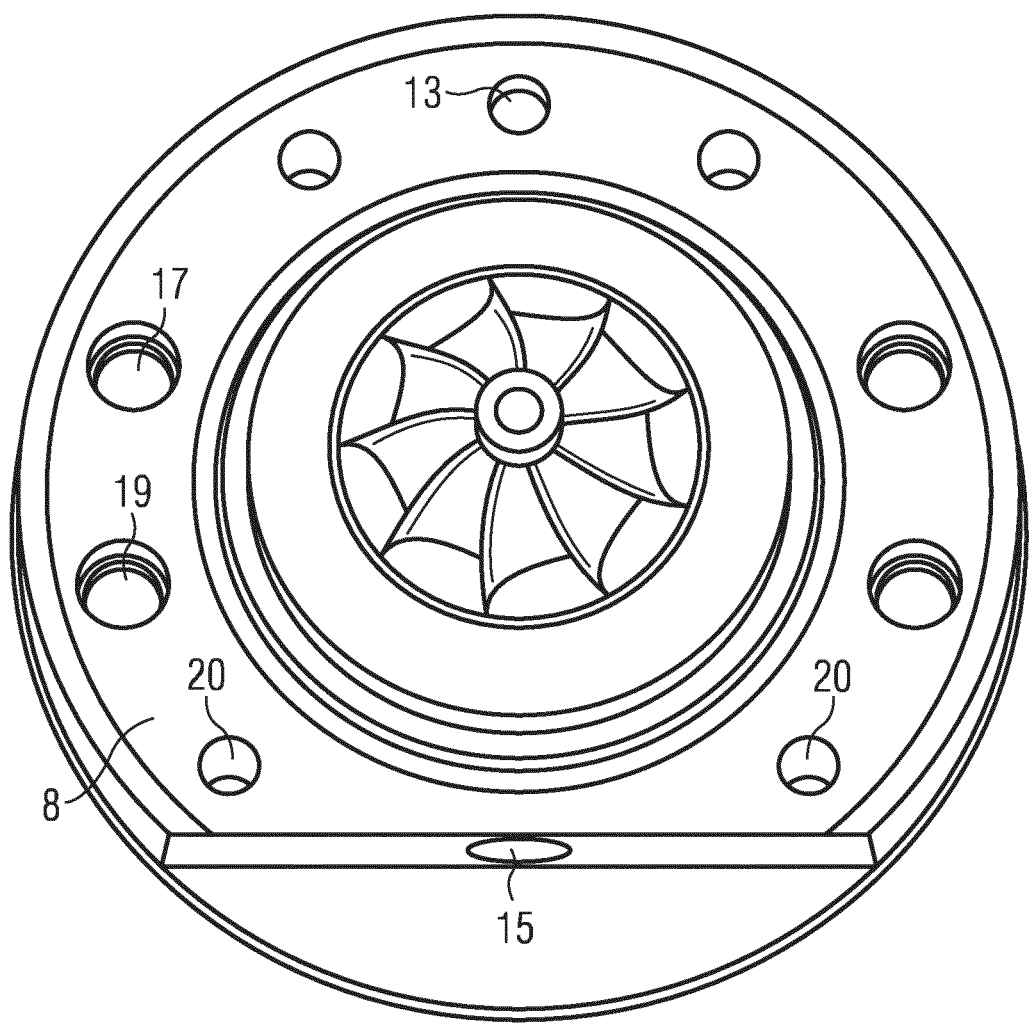
FIG. 4 shows a diagram intended to illustrate an illustrative embodiment of a sealing ring.

FIG. 4 shows a diagram intended to illustrate an illustrative embodiment of a flat gasket 8, by means of which the cooling water supply for the turbocharger is sealed off. This flat gasket 8 has an opening 13 for the oil inlet, an opening 17 for the water inlet, an opening 19 for the water outlet and openings 20 for fastening means. The fastening means by means of which the bearing unit 7 and the turbine or the entire turbocharger are fastened to the cylinder head can be passed through these fastening means openings 20 during the assembly of the turbocharger. Moreover, FIG. 4 shows an oil outlet opening 15, through which oil can be discharged from the bearing unit.

The invention claimed is:

1. A turbocharger assembly, comprising:
   a turbocharger integrated into an aperture in a cylinder head of an engine, said turbocharger including:
   a bearing unit and a shaft mounted in said bearing unit and defining an axial direction;
   a turbine housing formed integrally said aperture in the cylinder head;
   a turbine having a turbine wheel disposed on said shaft in said turbine housing;
   a compressor housing being a housing formed separately from the cylinder head; and
   a compressor having a compressor wheel disposed on said shaft in said compressor housing;
   said aperture in the cylinder head configured to receive said turbine wheel together with said bearing unit, said shaft, and said compressor wheel as a preassembled unit in the axial direction of said shaft;
   said turbine wheel together with said bearing unit, said shaft, and said compressor wheel being inserted as said preassembled unit into said aperture in the cylinder head in the axial direction of said shaft; and
   said compressor housing being fastened to the cylinder head and forming a closure element for said aperture in the cylinder head.

2. The turbocharger assembly according to claim 1, which further comprises a bearing unit housing, said compressor housing being fastened to said bearing unit housing.

3. The turbocharger assembly according to claim 1, which further comprises a cooling water supply leading through the cylinder head to said turbocharger.

4. The turbocharger assembly according to claim 3, which further comprises a single axial seal sealing off said cooling water supply leading to said turbocharger.

5. The turbocharger assembly according to claim 4, wherein said single axial seal is a flat gasket.

6. The turbocharger assembly according to claim 5, wherein said flat gasket has an opening for an oil inlet.

7. The turbocharger assembly according to claim 5, wherein said flat gasket has an opening for a water inlet and an opening for a water outlet.

8. The turbocharger assembly according to claim 5, wherein said flat gasket has openings for fasteners.

9. The turbocharger assembly according to claim 1, which further comprises an oil supply leading through the cylinder head to said turbocharger.

10. The turbocharger assembly according to claim 1, comprising a preassembled module including said shaft, said bearing unit, said turbine wheel, and said compressor wheel.

* * * * *